April 28, 1925.
G. PFISTER
1,535,374
PRESERVING SAP CONTAINING VEGETABLE MATTER SUCH AS GREEN FODDER FOR CATTLE
Filed Nov. 19, 1923
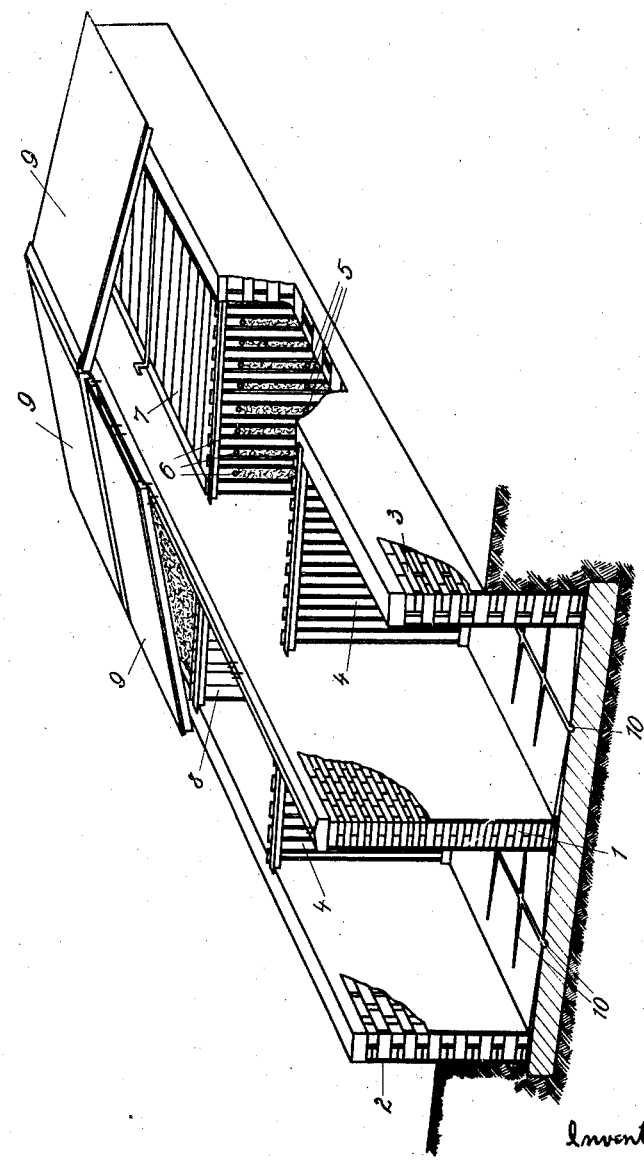
Inventor
Gerold Pfister
by Knight Bro
attorneys Patented Apr. 28, 1925.

1,535,374

UNITED STATES PATENT OFFICE.

GEROLD PFISTER, OF DRESDEN-ALTSTADT, GERMANY, ASSIGNOR TO SIEMENS-SCHUCKERTWERKE GESELLSCHAFT MIT BESCHRÄNKTER HAFTUNG, OF SIEMENS-STADT, NEAR BERLIN, GERMANY, A CORPORATION OF GERMANY.

PRESERVING SAP-CONTAINING VEGETABLE MATTER SUCH AS GREEN FODDER FOR CATTLE.

Application filed November 19, 1923. Serial No. 675,604.

*To all whom it may concern.*

Be it known that I, GEROLD PFISTER, a citizen of the German Empire, residing at Dresden-Altstadt, Germany, have invented certain new and useful Improvements in Preserving Sap-Containing Vegetable Matter Such as Green Fodder for Cattle, of which the following is a specification.

The invention relates to a new or improved process of and apparatus for preserving sap-containing vegetable matter, such as green fodder for cattle.

It has frequently been attempted to preserve sap-containing or green vegetable matter by storing and applying heat to it. A practical process, which gives satisfactory results, has, however, hitherto not been developed along these lines, because all heating bodies employed up to now are unsuitable for the purpose.

This invention consists of an improved process, according to which rod-like heating bodies are horizontally embedded in the vegetable matter. This process of heating gives no trouble whatever in practice, because after one layer of vegetable matter has been spread out in the storage chamber the rod-like heating bodies are simply laid on the top and the next layer is built up over them. If the piling up of the vegetable matter is continued in this manner a sufficient number of heating bodies is finally distributed over the entire vegetable mass to be preserved and ensures a heating extending uniformly to all parts of the vegetable matter. When the heating is finished the heating bodies can easily be withdrawn sideways. This process enables thus on the one hand the employment of the same heating bodies for a large quantity of fodder and on the other hand it saves the heating bodies, which need not be kept embedded in the vegetable matters for months against the chemical influences to which they are hardly ever entirely impervious for very long periods. Decisive for the utility of the improved process is, that the horizontal interstices formed after the withdrawal of the heating bodies are at once filled up again by the superimposed material sinking down under the action of gravity, while, as experience has proved, the interstices produced on the withdrawal of vertical heating bodies leave spaces which are not filled up again.

Sometimes it is desired to promote the preserving process by sending an electric current through the vegetable matter. In such cases the horizontal heating bodies may also be employed as electrodes. Here also their horizontal position is decisive for the success of the process. If they were arranged vertically or obliquely they would penetrate layers of different heights and experience has shown, that these layers behave so differently in regard to the electric conductivity, that a uniform electric action of the current is quite out of the question. The reason for this is the greater density of the higher loaded lower layers and the greater content of sap in the lower portions. Frequently it happens, furthermore, that different kinds of plants are piled up. According to this invention the differences may easily be compensated for by keeping the badly conducting layers longer under current or under higher voltage per path of the electric current or by connecting up a larger or smaller number of the current carrying electrodes. This adaptability to the differences in the vertical layers is also of benefit, if the embedded rods merely serve as heating bodies, as the heat conductivity also varies in the various layers.

As the electric current is at the present time the form of energy, which is most readily available for the farmer and can be controlled most easily a heating of the heating bodies by electric resistance is generally most suitable. The combination of the electric resistance heating with the electrode heating in which the fodder itself serves as resistance enables a simple adaptation and above all a regulation without loss. It is, for instance, possible to connect the electrical resistances and the current passage through the fodder in series, if it is desired to reduce the heating effect and to connect them in parallel, if the heating effect is to be increased. Numerous other connections (star, delta, switching off of individual heating rods) are also available.

The heating bodies are preferably given the shape of a tube, in the interior of which electric heating resistances are insulated against the walls of the tube. Instead of the electric current other sources of heat may be applied, however, such as steam, hot water or air and the like, which are set in circulation within the tubes. The walls of the tubes may simultaneously be employed as electrodes, so that one and the same body may act as heating body as well as electrode. The walls of the tubes may also be provided with perforations through which the heating agents introduced into the tubes may penetrate into the piled up fodder. The uniform heating of the stored fodder is thereby accelerated and it is, furthermore, possible to employ gases or liquids which have a sterilizing action upon the materials. Foodstuffs may in this manner be introduced into the fodder or aromatic substances, which render the fodder particularly acceptable to the cattle. The liquids thus introduced into the fodder may also contain glue-like substances, like dextrine, starch or the like, which stick the individual vegetable parts together and prevent a subsequent penetration of the air.

The improved process is of particular importance for the farmer, who wants to store his green fodder for a considerable length of time.

In the drawing a plant suitable for carrying out the improved process is shown by way of example.

Referring to the drawing it will be seen that the plant consists of a longitudinal pit or trench, two of such pits being preferably disposed side by side with a common vertical partition wall 1 between them, as shown. The width of the individual pit may be about 2 m. and their height is such that the fodder may also be piled up to a height of about 2 m. At this height of the pile the sidewalls 2 and 3 are subjected to a moderate strain, so that no special provisions need be made to attain the necessary strength. The charging of each pit commences at its closed rear end. For this purpose a vertical grid 4 is erected at a distance of about 2 m. from the rear wall. The hollow cube confined by the grid of 2 m. length at the edges is then filled up with the fodder. As soon as a layer of ¼ m. height has been deposited, the first row of heating bodies is placed on the top of this layer. Each heating body is hereby passed through the grid, so that its front end at which the electrical connections are provided remains accessible from the outside.

After further quantities of fodder have been deposited on the first layer up to about half the height of the cubicle a second row of heating bodies is passed through the grid in front and deposited on top of the rammed down fodder. About 1 cm. below the surface of the completely charged cubicle a third row of heating bodies is provided. Naturally the heating bodies may be arranged in fewer or in more numerous rows. In three-phase current plants the number of rows of heating bodies should preferably be divisible by 3 because each of the horizontal rows of heating bodies may then alternately be connected with one phase of the three-phase current supply. If it is, however, to be avoided that owing to the different consumption of energy in the layers at various levels the phases are unequally loaded vertically superimposed heating bodies may be combined into a group, which is connected with the same phase.

In the drawing the second cubicles or sections of both pits are already charged with fodder. The grids 4 are disposed in front of them. The projecting front faces 5 of the middle row of heating bodies and the front faces 6 of the upper row are visible in the drawing. A cover 7 enables the loading of the fodder to attain a certain density of the stored fodder and may at the same time serve as electrode which is connected with the neutral conductor. The walls of the pit are also made electrically conducting, for instance by embedding a wire grid in them and connected with the earthed neutral conductor. As soon as the preparation of the fodder has been finished, the entire available current is switched in in order to heat the fodder. The current is partly passed through the resistances in the interior of the heating bodies and partly through the fodder, as appears advisable in the specific case. Where the fodder itself offers so little resistance, that the current would grow too strong in it, the heating resistances and the current path are connected in series by the fodder. During the heating the fodder settles down considerably, so that the heating bodies also sink down. For this reason it is important that the spaces between the bars of the grids or grates be vertical, so that the ends of the heating bodies are not stopped in their descent. As soon as the preserving process has been finished the heating bodies are withdrawn. The interstices produced in the fodder are instantly closed by the pressure or weight of the fodder above them. A second grid 4 is then placed about 2 meters in front of the one already in position and the charging of a further section can commence. The first grid may be completed into a continuous wall entirely sealing the finished section by inserting laths or flat bars between the rods of the grid, as illustrated in connection with the grid 8 in the left-hand side pit. The partition wall between two completely charged compartments may also be pulled out from the top, where this appears advisable. The before described proceeding is continued until the pit or trench is filled up in its entire length or until the harvested fodder is disposed of. In order to render the pit or trench easily accessible, it is left open at the front end. Both trenches are at the bottom provided with gutters 10 in which rainwater or superfluous sap may flow out at the back. It is there collected and can, if worth while, be recovered and subjected to further treatment.

The walls of the pits or trenches need not be insulated, which is essential as far as the price of the plant is concerned, as insulation causes considerable costs and can mostly only be attained in a very imperfect degree. Inasmuch as in so far as electrode heating is employed the electrodes are embedded in the interior of the mass to be treated with electricity, it is of advantage for the uniform treatment of the fodder and particularly that situated near the walls, if the walls are good conductors. It is furthermore important that they be connected with the earthed neutral, as all danger to the attendants is then eliminated.

By means of carts running along the trenches or pits the latter may easily be charged without the employment of any machinery. As the heating is not exclusively confined to the electric conductivity of the fodder, the reduction of the fodder is not decisive for the success of the process, so that in many cases the expensive chaff-cutters are no longer required. The charged sections or compartments of the pits are covered with watertight wood covers 9.

In order to accelerate the heat transmission from the heating bodies to the fodder their heat radiating surface may be enlarged by a rib, which projects downwards. This rib may be withdrawn together with the heating body through the space in the partition wall and forms no obstacle for the tight packing of the fodder.

The heating bodies may be put at the disposal of the farmer in various lengths or may be extended by additional parts, so that the farmer is able to subdivide his pits into longer or shorter sections. The horizontally disposed rod-shaped electrodes follow a settling of the fodder much better than solid rigid covers put upon the fodder, which have frequently been employed, but which owing to the settling of the fodder in an unequal degree do not touch the fodder with their entire surface. Comparatively large surfaces of such rigid covers are also cut out of circuit, because the surface of the fodder becomes dry in parts and thus loses almost its entire conductivity. As the heating bodies, which according to the invention are also employed as electrodes, are completely surrounded by the fodder, these objections are entirely eliminated.

What I claim as my invention and desire to secure by Letters Patent is:

1. The process for preserving sap-containing vegetable matter, which consists in embedding rod-like heating bodies horizontally in the matter and heating said bodies.

2. The process for preserving green fodder which consists in embedding tubular heating bodies horizontally between layers of the fodder and introducing a heating medium into said bodies.

3. The process for preserving green fodder which consists in embedding perforated tubular heating bodies horizontally between layers of the fodder and passing a heating, sterilizing and enriching medium through them and into the fodder.

4. The process for preserving green fodder, which consists in putting a layer of fodder into a pit, placing a row of tubular heating bodies horizontally upon said layer, piling up another layer of fodder and another substantially horizontal row of heating bodies and so on until a stack is formed, and heating said bodies.

5. The process for preserving green fodder, which consists in putting a layer of fodder into a pit, placing a row of tubular heating bodies horizontally upon said layer, piling up another layer of fodder and another substantially horizontal row of heating bodies and so on until a stack is formed, heating said bodies and withdrawing them sideways from the stack after the treatment is completed.

6. The process for preserving green fodder, which consists in putting a layer of fodder into a pit, placing a row of tubular heating bodies horizontally upon said layer, piling up another layer of fodder and another substantially horizontal row of heating bodies and so on until a stack is formed, heating said bodies and employing them simultaneously as electrodes for sending an electric current through the material and withdrawing said heating electrodes sideways from the stack after the treatment is completed.

7. The process for preserving green fodder, which consists in embedding tubular bodies horizontally in the fodder, heating them electrically and at the same time using them as electrodes for passing an electric current through the fodder.

8. The process for preserving green fodder, which consists in putting a layer of fodder into a pit, placing a row of tubular heating bodies containing electrical resistances insulated from the walls horizontally upon said layer, stacking up another layer of fodder and another substantially horizontal row of heating bodies and so on until a stack is formed, passing an electric current through said resistance bodies and from tube to tube through the fodder and withdrawing said heating electrodes sideways from the stack after the treatment is completed.

In testimony whereof I affix my signature.

GEROLD PFISTER.